United States Patent [19]
Narvaez

[11] 4,194,644
[45] Mar. 25, 1980

[54] ELECTRICAL JUNCTION ACCESS DEVICE

[76] Inventor: Henry R. Narvaez, 8913 Las Cruces Cr., Houston, Tex. 77028

[21] Appl. No.: 893,278

[22] Filed: Apr. 5, 1978

[51] Int. Cl.² ............... B23Q 17/02; B23Q 17/18; H02G 3/08
[52] U.S. Cl. ............... 220/3.3; 33/174 G; 33/DIG. 10; 174/58; 220/3.8; 220/3.9; 248/DIG. 6
[58] Field of Search ............... 33/174 G, DIG. 10; 248/DIG. 6; 174/58, 48; 220/3.9, 3.92, 3.3, 3.5, 241, 3.94, 3.7, 3.2, 3.8; 30/358

[56] References Cited
U.S. PATENT DOCUMENTS

| | | | |
|---|---|---|---|
| 811,772 | 2/1906 | Gleason | 220/3.8 |
| 946,646 | 1/1910 | Pratt | 220/3.8 |
| 1,056,759 | 3/1913 | Mallery | 174/58 |
| 1,288,024 | 12/1918 | Kendig | 220/3.7 |
| 1,362,674 | 12/1920 | Clements | 220/3.92 X |
| 2,042,620 | 6/1936 | Noyes | 174/58 |
| 2,044,860 | 6/1936 | Silverman | 220/3.7 |
| 2,223,910 | 12/1940 | Gallagher | 248/DIG. 6 |
| 2,518,912 | 8/1950 | Lampe | 248/DIG. 6 |
| 2,757,817 | 8/1956 | Egan | 220/3.5 |
| 2,788,151 | 4/1957 | Shore | 220/3.8 X |
| 3,142,404 | 7/1964 | Krieps et al. | 220/270 X |
| 3,424,332 | 1/1969 | Pimentel | 174/58 X |
| 3,540,130 | 11/1970 | French | 33/174 G |
| 3,779,416 | 12/1973 | Wilcox | 220/270 |
| 3,873,759 | 3/1975 | Schindler et al. | 220/3.3 X |
| 3,888,013 | 6/1975 | Benoit | 33/174 G |
| 3,917,899 | 11/1975 | Oliver | 220/3.7 X |
| 3,926,330 | 12/1975 | Deming et al. | 220/3.9 |
| 3,950,857 | 4/1976 | Zanavich | 33/174 G |
| 4,007,852 | 2/1977 | Gernhardt | 220/3.2 |

*Primary Examiner*—Allan N. Shoap

[57] ABSTRACT

The invention comprises an electrical junction access device such as a junction box or a cover member therefor for positioning in a wall structure. The device includes a main body defining an opening and having outer surfaces facing away from the opening. The device further comprises guide means disposed outwardly of the main body and defining guide surfaces generally opposed to and spaced from the outer surfaces of the main body. A junction box according to the invention may also comprise port means in the front-to-rear walls with knock-out tongues disposed thereacross. The tongues have rear edges adjacent to but spaced from the back wall of the box whereby such edges may be engaged from the exterior of the box. Frangible connecting elements connect the tongues to the box distal the rear edges of the tongues.

11 Claims, 10 Drawing Figures

U.S. Patent   Mar. 25, 1980   Sheet 1 of 3   4,194,644
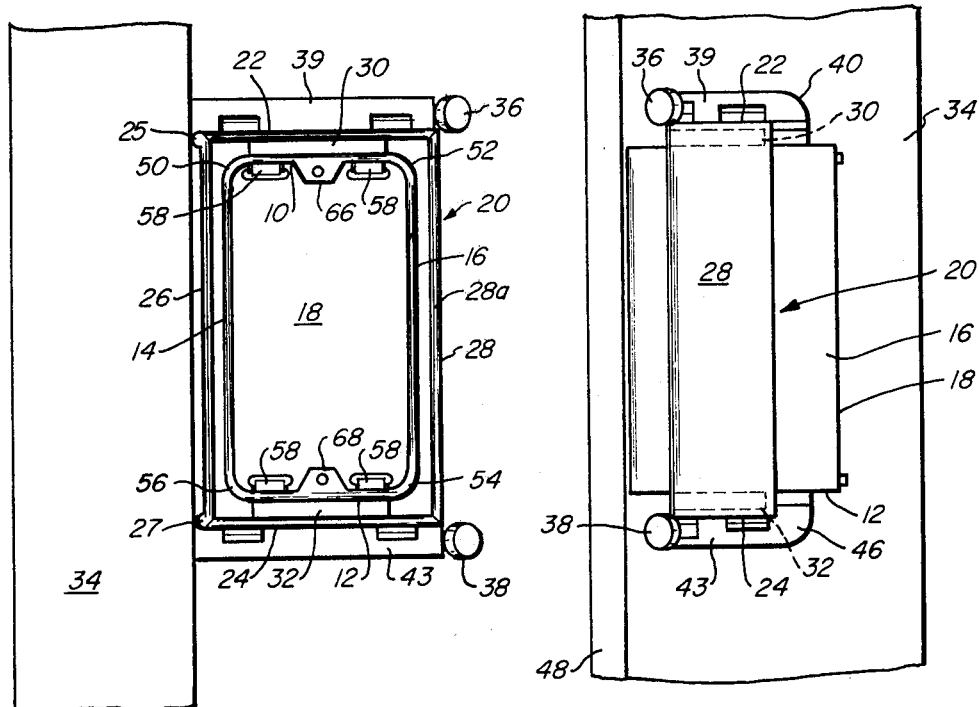
FIG. 2
FIG. 3
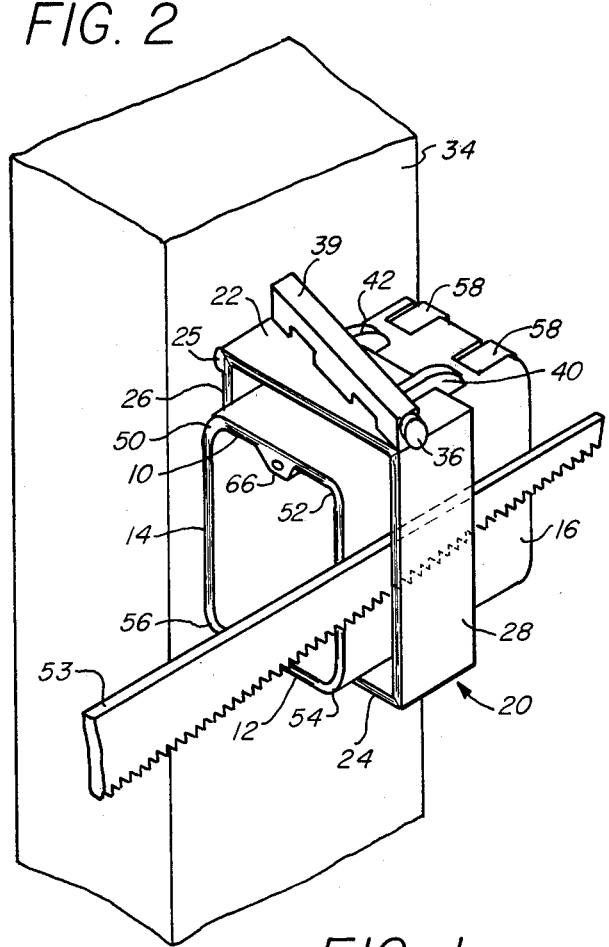
FIG. 1
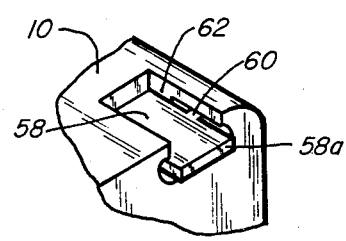
FIG. 4
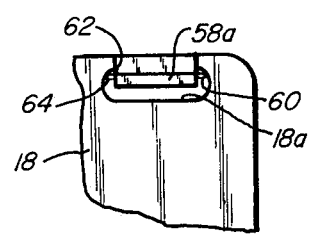
FIG. 5

ELECTRICAL JUNCTION ACCESS DEVICE

BACKGROUND OF THE INVENTION

1. Field of the Invention

The present invention relates to electrical junction access devices such as junction or utility boxes and/or cover members therefor. Junction boxes are commonly provided in wall structures to provide a situs for and access to electrical junctions. For example, they are frequently located at the site where an electrical switch, outlet, or other fixture is to be mounted on the wall. Such a box has a back wall and front to rear walls, the front being open. The box is typically nailed or otherwise attached to one of the underlying studs of the wall structure. Sheetrock or other such wall board material is emplaced over the stud and the box. A hole must be provided in this wall board to allow the switch or other fixture, accessible on the finished wall, to be connected into the electrical junction within the box. Such hole is then covered by a switch plate or like trim member through which the switch projects.

In some instances, the utility box is made considerably larger than the standard size switch plate so that it may accomodate a large electrical conduit. In such instances, the open front of the box may be covered by a cover member adapted to underlie the wall board and define a smaller, standard size opening for access to the switch.

2. Description of the Prior Art

Theoretically, the opening defined by the open front of the junction box, or by the cover member if one is used, should generally define the hole to be made in the wall board. However, difficulty is often experienced in cutting such a hole with precision after the wall board is in place, with the result that the hole can not be properly covered with the switch plate or other standard size trim member. On the other hand, if the hole is precut, proper alignment of the hole with the junction box becomes a problem.

U.S. Pat. No. 2,733,513; No. 3,522,658; and No. 2,887,776 disclose a various types of templates designed for the purpose of defining the locus of a hole to be cut in a wall board. However such devices are relatively troublesome in themselves and a simpler method is desirable.

U.S. Pat. No. 2,898,688 discloses a marking device which is emplaced over a utility box. The device has a number of forwardly projection teeth so that, when the sheetrock is emplaced and forced against the teeth, indentations are formed defining a cutting pattern. However, this device is also troublesome in that it must be removed after the hole is cut.

Another problem associated with junction boxes is in the provision of the necessary ports therethrough for receipt of electrical cables and the like. In present junction boxes made of plastic, the ports are usually preformed and covered by knock-out tabs. However, the tabs are inconvenient to remove since they must be broken out with a tool inserted into the box.

SUMMARY OF THE INVENTION

The present invention provides an electrical junction access device such as a junction box or a cover member therefor which has incorporated thereon guide means for enabling a precision hole to be cut in the overlying wall board. There is no need to employ templates or the like which must be independently positioned and held in place on the opposite side of the wall from the box, nor does the guide means in any way interfere with the proper finishing of the wall so that the guide means need not be removed after use.

In particular, the device of the present invention comprises a main body defining an opening and having outer surfaces facing away from the opening. The device also includes the aformentioned guide means disposed outwardly of the main body and defining guide surfaces generally opposed to and spaced from the outer surfaces of the main body.

The outer surfaces of the main body may generally define a rectangle or other polygon and the guide surfaces of the guide means preferably define a similar polygon surrounding the first polygon and positioned such that each side of one polygon is generally parallel to a respective side of the other. Spacer elements interconnecting the main body and the guide means are preferably disposed intermediate the ends of respective pairs of such parallel sides. Additionally, the inner polygon preferably has its sides joined by curved or bevelled corner portions so that such portions are spaced from the opposed corners of the outer polygon by distances greater than the distances between the opposed parallel sides of the two polygons. This facilitates manipulation of a saw or the like around the corner portions.

Thus in use a small hole may be made in the wall board within the opening defined by the main body of the device. A saw may then be worked outwardly from the small hole to a point between the outer surfaces of the main body and the guide surfaces of the guide means. Then the saw may be worked along these opposed sets of surfaces to cut a larger hole of precisely the proper size and shape. Since the spacers are located intermediate the ends of the straight lines of the opposed surfaces, it is fairly easy to continue cutting in the proper configuration even though the path between the opposed surfaces may be partially or totally interrupted by the spacer means. To further facilitate such cutting in the area of the spacer means, the latter may be rearwardly displaced from the forward extremity of the guide means and/or the outer surfaces of the main body. The rounded corner portions on at least one of the polygons defined by the opposed surfaces permit the saw to be negotiated around the corners without unduly great spacing between the surfaces.

Another salient feature of a utility or junction box in accord with a preferred form of the invention is the provision of improved knock-out tongues disposed across the pre-formed ports. These tongues have rear edges disposed adjacent to but spaced from the back wall of the box whereby these edges may be engaged from the exterior of the box. The tongues are connected to the main body of the box by frangible connecting elements distal the rear edges of the tongues. Thus the tongues may readily be broken away manually from the exterior of the box.

Additionally, the back wall of the box preferably has an edge portion opposed to the rear of the tongue. Thus, as an alternative method of removing the knock-out tongue, it may be struck from the outside of the box by a suitable tool. The edge portion of the back wall opposed to the rear of the tongue serves as a fulcrum permitting the connecting means, which are preferably located adjacent the front edge of the tongue, to be fractured by such blow, thereby freeing the entire tongue from the box. Since the rear portion of the tongue is preferably not directly attached to the box, the tongue may be inwardly offset from the front to rear walls and may include retainer means underlying the front to rear walls adjacent the port to restrict movement of the tongue thereby preventing premature removal thereof.

Accordingly, it is a principal object of the present invention to provide an improved means for facilitating precision cutting of an electrical junction access hole in installed wall board.

Another object of the present invention is to provide an electrical junction access device having guide means thereon.

A further object of the present invention is to provide an improved electrical junction box.

Still another object of the present invention is to provide an improved cover member for a junction box.

Yet a further object of the present invention is to provide a junction box having improved knock-out tongues.

Other objects, features and advantages of the present invention will be made apparent by the following description of the preferred embodiments, the drawings and the claims.

BRIEF DESCRIPTION OF THE DRAWINGS

FIG. 1 is a perspective view of a junction box according to the invention mounted on a wall stud.

FIG. 2 is a front elevational view of the junction box of FIG. 1.

FIG. 3 is a side elevational view of the junction box of FIGS. 1 and 2.

FIG. 4 is a perspective detail view of one of the knock-out tongues of the box of FIGS. 1-3.

FIG. 5 is a rear elevational view of the knock-out tongue of FIG. 4.

DESCRIPTION OF THE PREFERRED EMBODIMENTS

Figure 7:
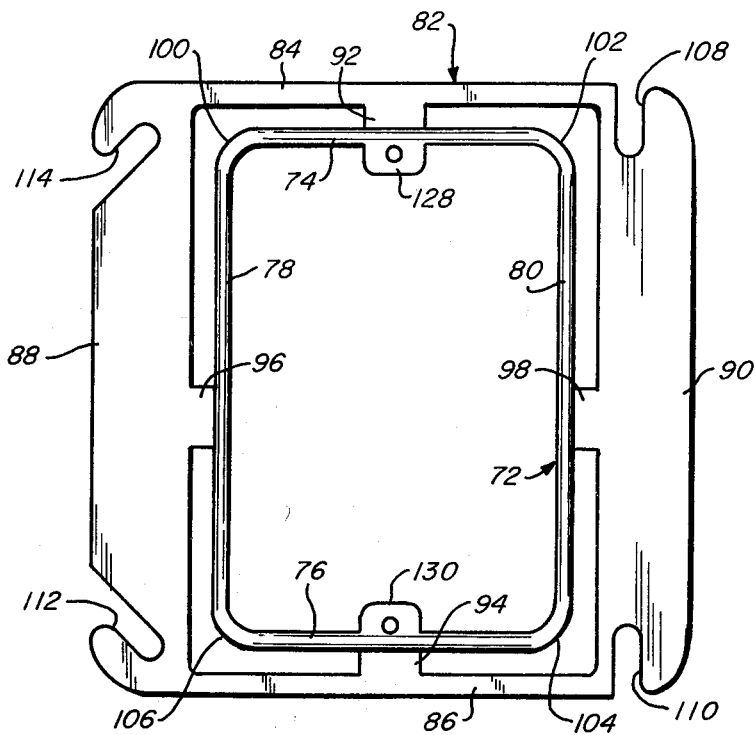
FIG. 7 is a front elevational view of the cover plate of FIG. 6.

Referring now to FIGS. 1-3 there is shown a first embodiment of the present invention in the form of a junction box or utility box. The box is generally rectangular and includes a main body comprising four front-to-rear walls (specifically upper and lower end walls 10 and 12 and left and right side walls 14 and 16) and a back wall 18. The front of the box is open so that the inner surfaces of walls 10, 12, 14 and 16 define an opening, i.e. the interior of the box. The outer surfaces of walls 10, 12, 14 and 16 face away from this opening. A rectangular guide sleeve 20 is mounted in surrounding relation to the walls 10, 12, 14 and 16 so that its inner surfaces are generally opposed to but spaced from the outer surfaces of said walls. In particular, sleeve 20 includes upper and lower runs 22 and 24 and left and right runs 26 and 28, each parallel to a respective one of the walls 10, 12, 14 and 16. Thus the outer surfaces of the walls 10, 12, 14 and 16 generally define a first rectangle. The inner surfaces of the various runs of sleeve 20 define a similar but larger rectangle disposed so that each side thereof lies parallel to a respective one of the sides of the first rectangle.

The sleeve 20 is mounted on the main body of the junction box by a pair of spacer elements 30 and 32. Element 30 interconnects the upper run 22 of sleeve 20 with upper wall 10 of the main body. Element 30 is disposed intermediate the ends of wall 10 and run 22 and toward the rear of run 22 to facilitate the negotiation of a saw in a manner to be described more fully below. Element 32 is similarly disposed toward the rear of lower run 24 of sleeve 20 and intermediate the ends of run 24 and lower main body wall 12 to interconnect said run and wall.

The junction box is adapted to be mounted in a wall structure by placing the left run 26 of the guide sleeve 20 in abutment with the side of one of the wall studs 34 and then securing the box to stud 34 by nails 36 and 38. Nail 36 is carried by a sleeve 39 mounted on the top of upper run 22 of sleeve 20. Brackets 40 and 42 extend from sleeve 39 over the rear of run 22 to upper wall 10 of the box. Brackets 40 and 42 brace sleeve 39 as well as guide sleeve 20 against the junction box. Sleeve 39 is oriented so that the nail 36 is angularly disposed with respect to the box with the head of the nail 36 forward of the point. This facilitates striking of the nail when mounting the box in the wall structure in a manner well known in the art. Nail 38 is angularly mounted on the bottom of lower run 24 of sleeve 20 by a similar sleeve 43 braced by brackets 44 and 46.

Left run 26 of guide sleeve 20 has beads 25 and 27 extending laterally outwardly therefrom at its upper and lower extremities respectively. Beads 25 and 27 provide load bearing surfaces which permit the device to be firmly secured against stud 34 without crushing or deformation of guide sleeve 20 along its left-hand run 26, which is disposed adjacent stud 34. Furthermore, sleeve 20, with its beads 25 and 27, serves to properly space and align the junction box with respect to stud 34. It can also be observed that, since the sleeve 20 is rearwardly offset from the front of the box, the device can easily be mounted so that the box protrudes forwardly from the stud 34 if desired.

After the junction box has been thus mounted on the wall stud 34, and the appropriate apparatus installed therein, sheetrock 48 (FIG. 3) or some other type of wall board may be mounted over the front of the box. The approximate location of the box behind the wall board 48 is known so that a small hole may be made through the wall board 48 in register with the opening defined by the main body of the box. A saw may then be worked outwardly from the small hole until it reaches the area between the outer surface of one of the walls 10, 12, 14 or 16 and the respective run 22, 24, 26 or 28 of the guide sleeve. The saw may then be worked around the entire periphery of the main body of the box in between the outer surfaces of the guide sleeve. Such inner surfaces thus serve as guide surfaces and, in cooperation with the outer surfaces of the walls 10, 12, 14 and 16, serve to permit the formation of a larger hole through the sheetrock 48 to precisely expose the main body of the box without misalignment or oversizing of such hole. While the sheetrock has been omitted from FIGS. 1 and 2 for purposes of clarity of illustration, FIG. 1 shows how a saw 53 may be disposed between the outer surfaces of the main body of the box and the inner or guide surfaces of the sleeve 20. After completion of the wall by plastering, etc., a switch may be installed and a switch plate or like fixture of standardized size corresponding to that of the main body of the junction box may be mounted over the box on the wall to cover the hole therein. Lugs 66 and 68 extend inwardly from respective walls 10 and 12 and have bores for receipt of screws for mounting the switch plate.

The walls 10, 12, 14 and 16 of the main body of the box are connected by curved corner portions 50, 52, 54 and 56. Thus these corner portions are spaced from the respective opposed corners of guide sleeve 20 by distances greater than the distances between the box walls 10, 12, 14 and 16 and the respective parallel runs 22, 24, 26 and 28 of sleeve 20. Accordingly, the saw is more easily negotiable around these corners. Alternatively, the corner portions 50, 52, 54 and 56 could be bevelled. Negotiation of the saw is further facilitated by the aforementioned displacement of the spacer elements 30 and 32 from the corners and by the fact that the forward edges of the box and guide sleeve are rounded as indicated by the shading in FIGS. 1 and 2. The disposition of the spacer elements near the rear of the sleeve 20 also permits the saw to be worked around the entire inner circumference of the sleeve 20.

In order to permit electrical wires and the like to be introduced into the interior of the main body of the box, ports are formed at opposite sides of each of walls 10 and 12 adjacent back wall 18. Each of the ports has a knock-out tongue 58 mounted thereacross. Spacer elements 30 and 32 are substantially as wide as the area between and including the support. Thus, the spacer elements serve as stops engageable with the saw blade to prevent the wires from being severed as the hole is being cut in the sheetrock.

FIGS. 4 and 5 show one of the upper tongues 58 in greater detail. Tongue 58 is offset inwardly with respect to the front-to-rear walls of the junction box main body, and specifically downwardly from the adjacent upper wall 10. The tongue 58 is rectangular having a rear edge 58a which extends rearwardly a short distance beyond the back wall 18 of the main body of the junction box. Thus the edge 58a is disposed adjacent to but spaced from wall 18 whereby it may be engaged from the exterior of the box. Such spacing and consequent ability of rear edge 58a to be engaged from the exterior of the box is further enhanced by the fact that back wall 18 is cut out to present an upper edge portion 18a opposed to but spaced from the rear portion of tongue 58. The forward edge of tongue 58, along with the adjacent portions of the side edges of tongue 58, is connected to upper wall 10 by connection means in the form of a thin web-like connection element 62. The rear portion of tongue 58 is not directly connected to the main body of the junction box. Therefore, tongue 58 is provided with retainer means in the form of thin web-like tabs 60 and 64 extending laterally outwardly from the unconnected portion of tongue 58 and underlying upper wall 10 of the junction box. The tabs 60 and 64 limit upward movement of the rear portion of the tongue 58 thereby preventing premature removal thereof.

Accordingly, tongue 58 can be removed from the main body of the junction box in either one or two modes. In one mode, the worker simply engages rear edge 58a from the exterior of the junction box with his finger or a suitable tool and peels the tongue 58 upwardly fracturing tabs 60 and 64 and connection element 62. As mentioned above, the protrusion of rear edge 58a from the back wall 18 of the junction box and the spacing of edge portion 18a of the back wall from the tongue facilitates engagement of edge 58a for removal in the first mode. In a second mode of removal, the worker may simply strike tongue 58 from above with a suitable tool such as a screwdriver. Edge portion 18a of back wall 18 of the junction box will provide a fulcrum for abutment with the rear portion of tongue 58 whereby the blow to tongue 58 will fracture the thin connection element 62 located distal rear edge 58a. In either mode, removal of tongue 58 is considerably simpler than is the case with many conventional knock-out tongues which must be removed by prying them loose with a tool inserted into the main body of the junction box. The lower tongues are substantially identical to the upper tongues except that their orientation is reversed and they are removed by pulling their rear edges downwardly or by striking upwardly with a tool.

The connecting elements 62 and tabs 60 and 64 may be formed of a suitable plastic, and preferably the entire main body of the junction box, along with the tongues 58 and the aforementioned connecting elements and tabs may be integrally formed of plastic. The guide sleeve 20 and spacer elements 30 and 32 may also be formed of plastic either integral with the main body of the box or connected thereto.

Figure 8:
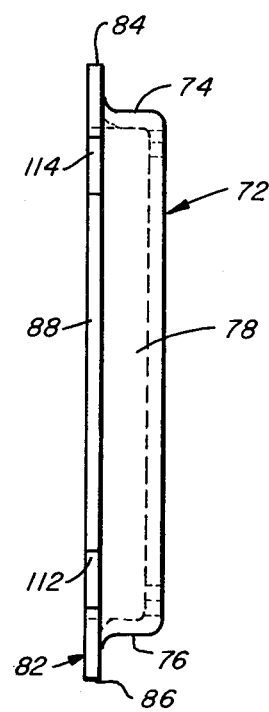
FIG. 8 is a side elevational view of the cover plate of FIGS. 6 and 7.
Figure 6:
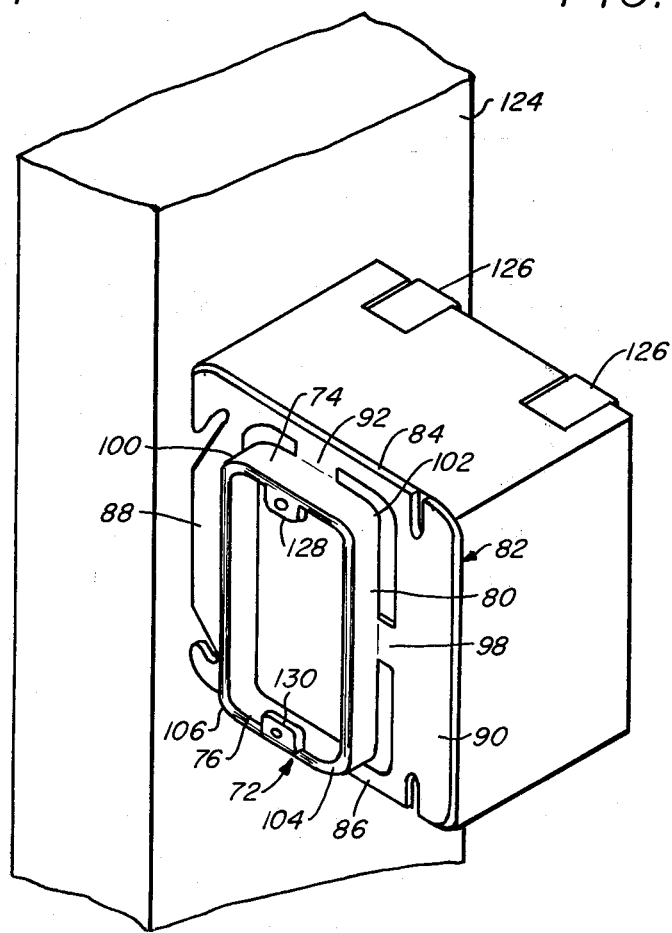
FIG. 6 is a perspective view of a junction box and cover plate according to a second embodiment of the invention.

Turning now to FIGS. 6–8, there is shown a second form of the invention in the form of a cover member for disposition on the front of a junction box or utility box 70. The box 70 is larger than the main body of the box of the preceding embodiment, being adapted to receive a large electrical conduit. The cover member serves as a converter to adapt the front opening defined by the box to a standard size for covering by a standard switch plate or other fixture.

The cover member includes a central main body 72 in the form of a rectangular sleeve which defines the aforementioned standard size opening. In particular, such opening is defined by the inner surfaces of the upper, lower, left and right runs 74, 76 78 and 80 respectively of the main body 72. The outer surfaces of runs 74, 76, 78 and 80 face away from the opening. A plate-like guide flange 82 of the cover member is disposed in surrounding relation to the rearmost extremity of the sleeve-like main body 72. The guide flange 82 has an upper run 82 disposed generally parallel to but spaced from the upper run 74 of the main body 72. Similarly, lower run 86 of the guide flange is parallel to and spaced from lower run 76 of the main body, and left and right runs 88 and 90 of the guide flange are parallel to but spaced from respective runs 78 and 80 of the main body. Thus the outer surfaces of the main body 72 generally define a rectangle each side of which is opposed to the parallel side of a similar rectangle generally defined by the inner surfaces of the guide flange 82. While in the embodiment shown, the outer surfaces of the main body and the inner surfaces of the guide flange are directly opposed, modifications are possible in which one such set of surfaces is offset from the other in the front-to-rear direction. Similar modifications are also possible in the other embodiments of the invention disclosed herein. However, two sets of surfaces will be considered to be "generally opposed" to each other, as that term is used herein, as long as one set faces generally outwardly and the other set faces generally inwardly so that the inner surfaces of the guide means may serve as guide surfaces in cooperation with the outer surfaces of the main body.

The various runs of the guide flange 82 are connected to the respective parallel runs of the main body 72 by respective spacer elements 92, 94, 96 and 98 integral with the guide flange 82. Each spacer element is disposed intermediate the ends of the respective runs of the main body and guide flange. The various runs of the main body are connected by curved portions 100, 102, 104 and 106.

Slots 108, 110, 112 and 114 are provided in the guide flange 82 for receipt of respective screws (not shown) used to connect the cover plate to the front of the junction box 70. The slots 108 and 110 on one side of the flange extend in a straight vertical direction, while slots 112 and 114 on the other side of the box extend angularly from the side edge of the flange to provide adjustability in the manner well known in the art. The box 70 is secured to a wall stud 124 in any convenient manner such as by nails (not shown) and is provided with knock-out tongues 126, which may be of the preferred type described above in connection with FIGS. 4 and 5, to open ports for receipt of electrical wires.

After sheetrock or other wall board has been emplaced over the cover plate, a small hole may be made in the wall board in register with the opening defined by the main body 72 of the cover plate. A saw or other cutting tool may then be worked outwardly until it is adjacent the outer surface of a portion of the main body 72. The tool may then be worked around the periphery of the main body guided by the inner surfaces of the guide flange 82. While the guide surfaces are interrupted by the spacer elements 92, 94, 96 and 98, the small size of these elements, their location intermediate the corners of the main body 72, and the fact that they are rearwardly offset from the forward extremity of the main body 72 make it relatively easy to work the tool past the spacer elements without deviating from the desired size and shape of the hole being formed. Negotiation of the tool around the corners is facilitated by the curved corner portions 100, 102, 104 and 106 of the main body. After completion of the hole and finishing of the wall structure, a switch plate or like fixture may be attached to the cover plate to cover the hole by screwing to lugs 128 and 130 extending from the upper and lower runs 74 and 76 of the main body 72 into the opening defined thereby.

Figure 10:
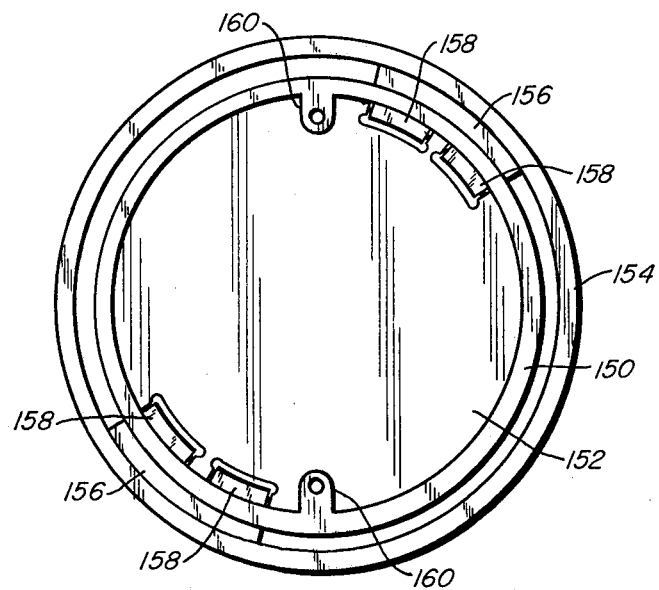
FIG. 10 is a plan view of the device of FIG. 9.
Figure 9:
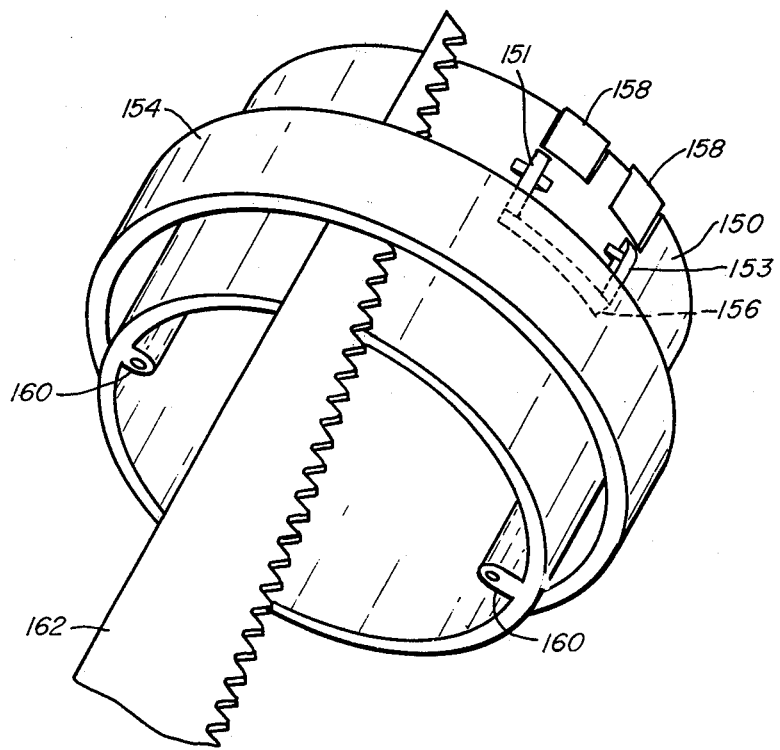
FIG. 9 is a perspective view of a junction access device for use with ceiling fixtures.

Referred now to FIGS. 9 and 10 there is shown a third embodiment of the invention designed for use in providing access to electrical junctions for mounting light fixtures or similar fixtures, as opposed to the switches and outlets typically used with the preceding embodiments. The device includes a juncture box having a cylindrical portion 150 forming the front-to-rear walls of the main body. The inner surfaces of cylindrical portion 150 define an opening. One end of the cylinder is closed by a back wall 152. The other end, i.e. that portion which faces toward the fixture to be installed, will be considered the "forward" extremity of the main body even through the device may be used in horizontal wall structures such as ceilings as well as in vertical walls. An annular guide sleeve 154 coaxially surrounds the cylindrical portion 150 of the main body and is connected thereto by spacer elements 156 whereby the inner surfaces of the sleeve 154 are opposed to but spaced from the outer surfaces of the main body. The spacer elements 156 are rearwardly offset from the forward extremities of both the portion 150 and the sleeve 154. Sleeve 154 is further braced against portion 150 by brackets 151 and 153.

The cylindrical portion 150 of the main body is also provided with knock-out tongues 158, preferably of the type described in connection with FIGS. 4 and 5. The tongues 158 are arranged in pairs, and each of the spacer elements 156 is aligned with a respective pair of the tongues 158 to serve as a stop to prevent severing of wires to be inserted through the openings provided by removal of tongues 158.

Lugs 160 extend inwardly from the cylindrical portion 150 so that the light fixture or other fixture may be connected thereto. The device is installed in a wall structure in any suitable manner and then covered with sheetrock or the like. A small hole is then made in the sheetrock in register with the opening of the main body. A saw 162 or other tool is then worked outwardly into the space between the outer surfaces of portion 150 and the inner surface of the sleeve 154. The saw may then be worked around the entire periphery of the portion 150 within this space, the inner surfaces of the sleeve 154 serving as a guide surface. The rearward offsetting of the spacer elements 156 facilitates working of the saw therepast. The ceiling may then be finished and the fixture installed in the manner well known in the art.

From the foregoing it can be seen that the present invention provides an improved means for guiding the formation of a hole in wall board of a precise size and shape to provide access to an electrical juncture. In particular, the guide means is provided on a juncture access device such as a juncture box or cover therefor. No elaborate external templates, support means or the like are required, and the device including the guide means remains in the wall after use. The invention also provides an improved type of knock-out tongue for juncture boxes, which tongue may be engaged and broken away manually from the exterior of the box.

It will also be appreciated that numerous modifications of the preferred embodiments shown may be made without departing from the spirit of the invention. For example, changes in the shape of the device, the form of the spacer elements, etc. are contemplated. More specifically, various features of the different embodiments described above may be combined and interchanged. For example, the rounded forward edges of the main body of the junction box and guide sleeve in the embodiment of FIGS. 1-3 may be incorporated in the analogous locations of the other embodiments. Other modifications might be made in accord with differences in the materials used to form the device. For example, the embodiments shown are formed of relatively rigid materials such as hard plastics or metals. Thus, the spacer elements of these embodiments can be relatively small. However, where a flimsier material such as asbestos is used, it might be necessary to provide spacer elements around virtually the entire extent of the guide surfaces. It is thus intended that the scope of the invention be limited only by the claims which follow.

I claim:

1. An electrical junction access device for positioning in a wall structure and having a main body including a back wall and a tubular wall extending forwardly therefrom to form an enclosed area for electrical apparatus and defining a forward opening into said enclosed area opposite the back wall, said tubular wall having inner surfaces facing into said enclosed area and outer surfaces facing away from said enclosed area;

a guide sleeve externally surrounding said tubular wall and defining guide surfaces generally opposed to said outer surfaces of the tubular wall above and below and on either side thereof;

and spacer means interconnecting said main body and said sleeve to support said sleeve on said main body and spacing said guide surfaces of said sleeve from said outer surfaces of said tubular wall by a distance great enough to permit a cutting instrument to be inserted between said outer surfaces and guide surfaces but small enough to restrain the instrument to a cutting path generally parallel to and adjacent to said outer surfaces, said spacer means being rearwardly offset from the forward extremity of said sleeve and extending inwardly from said guide surfaces toward said tubular wall.

2. The device of claim 1 wherein said outer surfaces of said tubular wall generally define a first polygon, wherein said guide surfaces of said guide means generally define a similar polygon generally surrounding said first polygon, each side of said first polygon being generally parallel to a respective side of said similar polygon, and wherein said spacer means includes at least one spacer element disposed intermediate the ends of a pair of the parallel sides of said polygons.

3. The device of claim 2 wherein there are a plurality of said spacer elements each disposed on a respective pair of said parallel sides of said polygons.

4. The device of claim 1 wherein said outer surfaces of said tubular wall generally define a first polygon, and wherein said guide surfaces of said guide means generally define a similar polygon surrounding said first polygon, each side of said first polygon being generally parallel to a respective side of said similar polygon.

5. The device of claim 4 wherein the polygons have generally opposed corner portions, the corner portions of said second polygon being more sharply angular than the corner portions of said first polygon such that the corner portions of said first polygon are spaced inwardly from the respective opposed corner portions of said second polygon by distances greater than the distances between said parallel sides.

6. The device of claim 5 wherein said polygons are rectangles.

7. The device of claim 1 wherein said outer surfaces of said tubular wall generally define a first circle, and wherein said guide surfaces of said guide means generally define a second circle coaxially surrounding said first circle.

8. The device of claim 1 wherein said sleeve and said tubular wall have rounded forward edges.

9. The device of claim 1 wherein said tubular wall has curved corner portions.

10. An electrical junction access device for positioning in a wall structure and having a main body including inner surfaces defining and facing an enclosed area and outer surfaces facing away from said enclosed area, said main body having an access opening into the enclosed area of generally equal length and width to said enclosed area, and guide means adjoined to said main body and disposed outwardly thereof, said guide means defining guide surfaces generally opposed to and spaced from said outer surfaces of said main body, wherein said outer surfaces generally define a first polygon, and wherein said guide surfaces generally define a second similar polygon surrounding said first polygon, each side of said first polygon being generally parallel to a respective side of the second polygon, each such pair of parallel sides being spaced apart by a distance great enough to permit a cutting instrument to be inserted between said outer surfaces and said guide surfaces but small enough to restrain the instrument to a cutting path generally parallel to and adjacent to said outer surfaces, and wherein the polygons have generally opposed corner portions, the corner portions of said second polygon being more sharply angular than the corner portions of said first polygon so that the corner portions of said first polygon are spaced inwardly from the respective opposed corner portions of said second polygon by distances greater than the distances between said parallel sides.

11. A cover member for mounting over the front opening of a junction box, the junction box having a back wall and a tubular wall extending forwardly therefrom to define an enclosure with a front opening opposite the back wall, said cover comprising:

a wall element defining and enclosing an access opening for alignment with but smaller than the front opening of the junction box;

a guide sleeve externally surrounding said wall element and sized for engagement with the tubular wall adjacent the front opening and defining guide surfaces generally opposed to the outer surfaces of said wall element;

and spacer means interconnecting said wall element and said sleeve to support said sleeve on said wall element and spacing said guide surfaces of said sleeve from the outer surfaces of said wall element by a distance great enough to permit a cutting instrument to be inserted between said outer surfaces and guide surfaces but small enough to restrain the instrument to a cutting path generally parallel to and adjacent to said outer surfaces, said spacer means being rearwardly offset from the forward extremity of said wall element and extending inwardly from said guide surfaces toward said wall element.

* * * * *